April 13, 1926.                      1,580,471
J. A. DUCA
FLUE CUTTER
Filed Dec. 10, 1923

Inventor
J. A. Duca
By Larry & Larry, Attorneys

Patented Apr. 13, 1926.

1,580,471

UNITED STATES PATENT OFFICE.

JOAN A. DUCA, OF SHAWNEE, OKLAHOMA, ASSIGNOR OF ONE-HALF TO HENRY J. MACKEY, OF OKLAHOMA CITY, OKLAHOMA.

FLUE CUTTER.

Application filed December 10, 1923. Serial No. 679,788.

*To all whom it may concern:*

Be it known that JOAN A. DUCA, a citizen of the United States, residing at Shawnee, in the county of Pottawatomie and State of Oklahoma, has invented certain new and useful Improvements in Flue Cutters, of which the following is a specification.

This invention relates to improvements in flue cutters and has as its general object to provide a tool of this class which will be highly efficient in its operation and will, by reason of its peculiar construction, greatly facilitate the operation of cutting a flue.

Another object of the invention is to provide, in a flue cutter, a novel means for mounting the blade of the cutter to provide for its ready removal and replacement as occasion may require.

Another object of the invention is to provide a novel abutment means for the blade adapted to support it in a most substantial manner in its cutting position and without any likelihood of the blade sinking into the shank of the tool.

Another object of the invention is to provide the shank of the tool, at its entering end, with means for scraping out, to a considerable extent, the scale accumulations within the flue and thus prevent dulling of the blade at the time the initial cut is made thereby.

Figure 1:
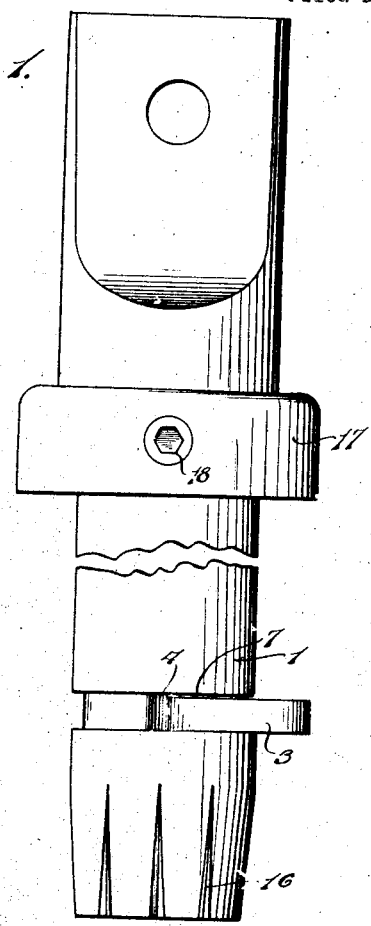
Figure 1 is a view in elevation of the flue cutter embodying the invention.
Figure 3:
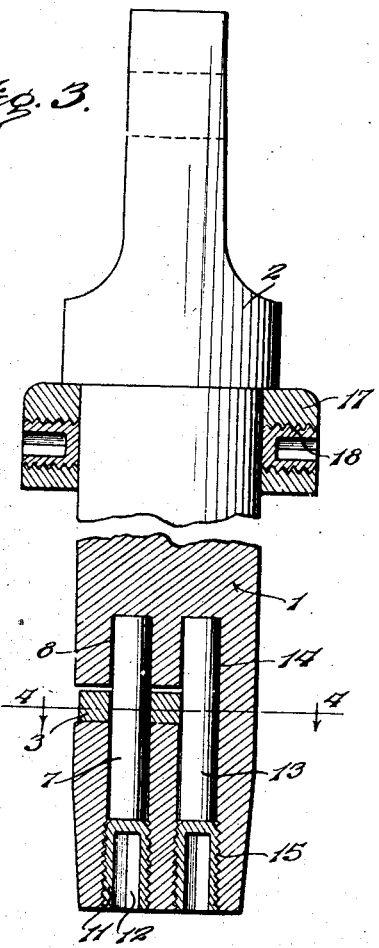
Figure 3 is a longitudinal sectional view taken substantially on the line 3—3 of Figure 2 looking in the direction indicated by the arrows.
Figure 2:
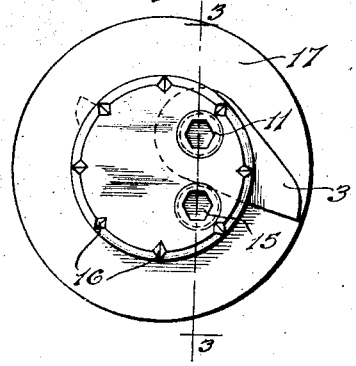
Figure 2 is a front end elevation of the tool.

The tool comprises a shank which is indicated in general by the numeral 1 and which is provided with a tang 2 for the connection of the usual means (not shown) whereby the tool may be rotated after insertion into the flue to be cut. The blade of the tool is indicated by the numeral 3 and the same is pivotally supported within a slot 4 formed in the shank 1, in a manner and by a means which will now be described.

Figure 4:
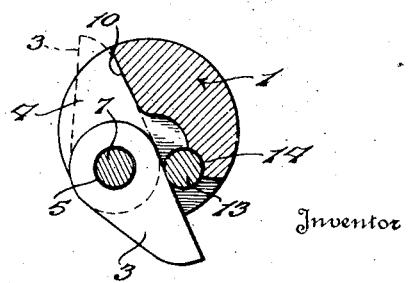
Figure 4 is a diametric sectional view substantially on the line 4—4 of Figure 3 looking in the direction indicated by the arrows, the blade being shown in full lines in full cutting position and in dotted lines in its initial cutting position.

The blade 3 is formed at its inner end with an opening 5 and at its outer end with a cutting tooth indicated by the numeral 6, and the blade is pivotally supported upon a pin 7 of cylindrical form and preferably of hardened steel, the pin being removably fitted into a bore 8 formed longitudinally in the shank 1 of the tool parallel and eccentric to the axis of the said shank, the bore transecting the slot 4 and the intermediate portion of the pin therefore extending across the slot and through the opening 5 in the blade. The blade is of a thickness to be relatively snugly received within the slot 4 and, in the initial working position of the blade shown in Figure 4 of the drawing in dotted lines, the advancing edge of the blade indicated by the numeral 9, is designed to rest squarely against a portion 10 of the bottom wall of the slot 4, this portion of the said bottom wall constituting an abutment shoulder for the said edge of the blade. In this position of the blade the cutting tooth 6 will project a sufficient distance beyond the circumferential surface of the shank to bite into the wall of the flue to be cut when the tool is properly rotated. As stated, the supporting pin 7 for the blade is removably disposed within the bore 8, and in order that the pin may be normally retained within the bore, a plug 11 is threaded into the outer end of the bore and has its inner end bearing against the outer end of the pin and its outer end flush with the outer end face of the shank 1, the plug having a polygonal socket 12 adapting a wrench to be applied to the plug for the purpose of threading it into place or unthreading it, it being understood that upon removal of the plug, the pin 7 may be dislodged from the bore 8 and the blade 3 thus freed for removal from the slot 4. It will be evident that when the tool is rotated the cutting tooth of the blade will bite into the wall of the tube, and in the continued rotation of the tube, the blade will cut into the wall of the tool, the blade will cut into the wall of the tube and finally the blade will penetrate the wall and be moved about its pivot to assume the full line position shown in the several figures of the drawing and particularly in Figure 4. At this time it is desirable to give firm support to the back of the blade and to prevent the back of the blade sinking into the bottom wall of the slot 4, and to accomplish this result, a backing or stop pin 13 is removably fitted into a bore 14 formed longitudinally in the shank 1 of the tool parallel to the axis of the shank and to the bore 8. The pin 13 traverses the slot 4 and, as illustrated in Figure 4 of the drawing, constitutes an abutment against which the back of the blade may rest when the blade is in the full cutting position shown in full lines in the said figure. In order that the pin 13 may be retained in the bore 14, a plug 15 corresponding to the plug 11 is removably threaded into the outer end of the said bore 14 and coacts with the pin 13 in the same manner as previously explained in connection with the pin 7 and plug 11. The pin 13 will preferably be made of hardened steel and will therefore be better enabled to withstand the strains imposed upon the blade 3 than would be the material of the shank itself.

In order that a considerable portion of the scale accumulation upon the wall of the tube may be cleared away before the blade begins to act, thereby to an extent preventing dulling of the blade, the portion of the shank 1 of the tool beyond the point of location of the blade 3, is formed with a circumferential series of flutes indicated by the numeral 16.

In order that the tool may be so adjusted as to insure cutter 3 penetrating and cutting the flue at the proper point and without likelihood or injury to the flue sheet, a stop collar 17 is fitted onto the shank of the tool and held in place by set screws 18 of the flush type. It will be evident that the collar 17 may be adjusted the proper distance from the point of location of the cutter 3 so that when the tool shank is inserted into the flue and the collar 17 abuts against the furnace wall, the cutter will be in precisely the proper position to cut the flue without injuring the flue sheet.

Having thus described the invention, what is claimed as new is:

1. A flue cutter comprising a shank having a transverse slot in one side and provided with a longitudinal bore transecting the slot, a blade disposed at one end within the slot, a pivot pin removably seated within the bore and extending through the said end of the blade, and a retaining plug independent of the pin removably seated within the end of the bore and confining the said pivot pin therein.

2. A flue cutter comprising a shank having a transverse slot in one side and provided with a longitudinal bore transecting the slot, a blade disposed at one end within the slot, a pivot pin removably seated within the bore and extending through the said end of the blade, and a threaded plug removably fitted into the outer end of the bore and confining the said pivot pin within the bore and having its end substantially flush with the end face of the shank.

3. A flue cutter comprising a shank having a transverse slot in one side and provided with a longitudinal bore transecting the slot, a blade pivotally mounted at one end within the slot, and an abutment pin removably seated in the bore and extending across the said slot in position for engagement by the blade.

4. A flue cutter comprising a shank having a transverse slot in one side and provided with a longitudinal bore transecting the slot, a blade pivotally mounted at one end within the slot, an abutment pin removably seated in the bore and extending across the said slot in position for engagement by the blade, and means fitted into the outer end of the bore and retaining the said pin in place.

In testimony whereof I affix my signature.

JOAN A. DUCA. [L. S.]